United States Patent
Yang et al.

(10) Patent No.: US 11,534,738 B1
(45) Date of Patent: Dec. 27, 2022

(54) PREPARATION METHOD AND APPLICATION OF ZERO-VALENT ALUMINUM/IRON-BEARING CLAY COMPOSITE FOR CATALYZING PERSULFATE TO OXIDIZE ORGANICS

(71) Applicant: NANJING UNIVERSITY, Nanjing (CN)

(72) Inventors: Hu Yang, Nanjing (CN); Ran Yang, Yichang (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/870,781

(22) Filed: Jul. 21, 2022

(30) Foreign Application Priority Data

Oct. 28, 2021 (CN) .......................... 202111262890.X

(51) Int. Cl.
*B01J 23/74* (2006.01)
*B01J 23/745* (2006.01)
*C02F 1/72* (2006.01)
*C02F 101/30* (2006.01)

(52) U.S. Cl.
CPC ............. *B01J 23/745* (2013.01); *C02F 1/725* (2013.01); *C02F 2101/30* (2013.01)

(58) Field of Classification Search
CPC ...... C02F 1/72; C02F 1/70; C02F 1/00; C02F 1/66; B01J 23/74
See application file for complete search history.

(56) References Cited

FOREIGN PATENT DOCUMENTS

CN 112811557 A * 5/2021

OTHER PUBLICATIONS

Ran Yang et.al, "Enhanced reactivity of zero-vlent aluminum/$O_2$ by using Fe-bearing clays in 4-chlorophenol oxidation", Science of the Total Environment, vol. 773 (2021), p. 145661, State key laboratory of pollution control and resource reuse, School of the environment, Nanjing University, PR China, Feb. 6, 2021.

(Continued)

*Primary Examiner* — Cameron J Allen
(74) *Attorney, Agent, or Firm* — Hemisphere Law, PLLC; Zhigang Ma

(57) ABSTRACT

A preparation method and application of a zero-valent aluminum/iron-bearing clay composite for catalyzing a persulfate to oxidize organics are provided, which belongs to the field of water environmental treatment. A novel catalyst is prepared by an iron-bearing clay and a zero-valent aluminum through a simple ball milling method, for achieving the effect of activating a persulfate to efficiently oxidize and degrade refractory organics in water. The preparation method and operation process thereof are simple. Compared with a chemical synthesis method, the method of the present disclosure brings about less secondary pollution, and has a shorter synthesis time, higher yield and lower cost. The modified material is the natural iron-bearing clay, which is widely available, non-toxic and stable as a heterogeneous catalyst.

3 Claims, 7 Drawing Sheets

(56) References Cited

OTHER PUBLICATIONS

Ning Chen et.al, "Surface-bound radical control rapid organic contaminant degradation through peroxymonosulfate activation by reduced Fe-bearing smectite clays", Journal of Hazardous Materials, vol. 389 (2020), p. 121819, State Key Laboratory of Pollution Control and Resource Reuse, School of the Environment, Nanjing University, Nanjing 210023, Jiangsu Province, PR China, Dec. 3, 2019.
CNIPA, Notification of a First Office Action for CN202111262890.X, Apr. 7, 2022.
Nanjing University (Applicant), Reply to Notification of a First Office Action for CN202111262890.X, dated Apr. 11, 2022.
CNIPA, Notification of a Second Office Action for CN202111262890.X, dated Apr. 26, 2022.
Nanjing University (Applicant), Reply to Notification of a Second Office Action for CN202111262890.X, w/ allowed replacement claims, dated Apr. 29, 2022.
CNIPA, Notification to grant patent right for invention in CN202111262890.X, dated May 20, 2022.

\* cited by examiner

PREPARATION METHOD AND APPLICATION OF ZERO-VALENT ALUMINUM/IRON-BEARING CLAY COMPOSITE FOR CATALYZING PERSULFATE TO OXIDIZE ORGANICS

TECHNICAL FIELD

The present disclosure relates to the preparation of a novel catalyst by an iron-bearing clay and a zero-valent aluminum through a simple ball milling method, for achieving the effect of activating a persulfate to efficiently oxidize and degrade refractory organics in water, and belongs to the field of water environment treatment.

DESCRIPTION OF RELATED ART

In recent years, pollution of refractory organics such as pesticides, disinfection by-products, medicines and personal care products to water has destroyed a stability of an ecosystem and affected the development of industry and agriculture. Most of the refractory organics are difficult to be biodegraded, and have high toxicity, and a removal rate thereof is low for traditional treatment methods. An advanced oxidation method, as a method that can completely mineralize pollutants, can effectively reduce toxicity of the pollutants and increase biodegradability of the pollutants, and thereby has attracted more and more attention. At present, a pollutant degrading technology based on activation of a persulfate (PS) to produce sulfate radicals becomes a novel advanced oxidation technology, which can replace the traditional Fenton technology.

Zero-valent metals (ZVMs) have been used in sewage treatment, groundwater remediation, soil remediation and other fields due to their strong reducibility, extensive sources and reusability. The research on the ZVMs focuses on the application of a zero-valent iron (ZVI), a zero-valent zinc (ZVZ) and a zero-valent copper (ZVC). In recent years, a zero-valent aluminum (ZVAl) has attracted more and more attention because of its lower reduction potential) ($E^0(Al^{3+}/Al^0$))=−1.662 V compared with other ZVMs, and its amphoteric property (the reaction pH can be extended to alkaline). At present, the research on the ZVAl in the environmental field mainly focuses on two systems: an oxidation system based on zero-valent aluminum/oxidant system and a reduction system based on zero-valent aluminum/anaerobic system. However, due to an active nature of the ZVAl, a dense surface oxide film can be rapidly formed in the air, which leads to its stable property at pH value in a range of 4 to 9, and affects an exposure of $Al^0$ surface and electron transfer from it. Therefore, the application pH range of its reducibility is narrow. In order to broaden its applicable pH range, a series of auxiliary methods, such as addition of energy, pretreatment with acid washing, addition of chemicals, modification of materials, etc., have been proposed by many scholars to improve the efficiency of the oxidation system. The core of these improvement methods is to destroy the oxide film to increase the electron transfer efficiency. In recent years, some scholars used a mechanical ball milling method to activate aluminum powder in the reaction of aluminum and water for production of hydrogen for reference, and applied the ball milled aluminum powder in the environmental field to improve a reduction activity thereof.

Some natural clay minerals contain elements such as Sulphur (S), Manganese (Mn), Ferrum (Fe), etc., which make them have redox-active properties, and can affect biochemical cycling of elements in nature and the migration of pollutants. Specifically, Fe(III)/Fe(II) redox couple in iron-bearing clay minerals plays a role of redox buffer for the circulation in nature, which can change with the change of surrounding redox conditions. The element Fe in the clay minerals often exists in the form of Fe(III), which can be reduced to structural Fe(II) by biological or chemical reduction, so that it has an ability to reduce heavy metals, radioactive elements and nitrates, and activate oxygen, hydrogen peroxide and peroxymonosulfate to generate free radicals to oxidize organic pollutants. In addition, the fine-grained clay minerals have large specific surface area, stable skeleton structure and green and nontoxic characteristics, making them potential functional materials for environmental remediation.

Previous studies have shown that PS can accelerate surface electrochemical corrosion of a nanoscale zero-valent aluminum materials (nZVAl), thus allowing the nZVAl/PS system to efficiently degrade contaminants over a wide pH range. However, micro-scale zero-valent aluminum (mZVAl) is more cost-effective and environmentally-friendly than nZVAl, yet it has a lower specific surface area than nZVAl, making its activation for the PS inefficient.

SUMMARY

The objective of the present disclosure is to provide a novel composite catalyst synthesized from a micro-scale zero-valent aluminum and a natural iron-bearing clay mineral using a simple ball milling method and a preparing method thereof, and the composite catalyst has a low cost and no pollution, and can be applied in wastewater to achieve an effect of efficiently activating PS to oxidize refractory organics.

In order to solve at least one technical problem of the present disclosure, a method for preparing a zero-valent aluminum/iron-bearing clay composite is provided. The composite is prepared as a composite catalyst by mixing a micro-scale zero-valent aluminum and a natural iron-bearing clay with ball milling; a particle size of the micro-scale zero-valent aluminum is in a range of 100 meshes to 200 meshes (namely, from 75 μm to 150 μm); and the natural iron-bearing clay mineral is one selected from the group consisting of nontronite, montmorillonite, attapulgite and bentonite. Specifically, the method may include: mixing the micro-scale zero-valent aluminum with the natural iron-bearing clay mineral in a mass ratio in a range of 1:2 to 8:1, and then placing in an agate ball milling jar; adding agate balls with a ball to material mass ratio in a range of 20:1 to 50:1 to the agate ball milling jar; putting the agate ball milling jar into a vacuum jacket for vacuumizing and then performing ball milling to obtain mixed powder, where a duration of the ball milling is controlled in a range of 0.5 hours (h) to 4 h, and a rotation rate of planetary ball mill is controlled in a range of 200 revolutions per minute (rpm) to 800 rpm; and placing the mixed powder obtained after the ball milling in a glove box, and drying the mixed powder to obtain the zero-valent aluminum/iron-bearing clay composite.

In a preferable embodiment, the mass ratio of the micro-scale zero-valent aluminum and the natural iron-bearing clay mineral is 1:1.

In a preferable embodiment, the natural iron-bearing clay mineral is nontronite.

In order to solve at least one technical problem of the present disclosure, a refractory organic matter removing method using the composite of zero-valent aluminum/iron-bearing clay composite is provided, including: adding the zero-valent aluminum/iron-bearing clay composite as per a ratio in a range of 0.2 g/L to 1.5 g/L and a persulfate as per a ratio in a range of 119 mg/L to 1904 mg/L into an organic pollutant solution, and the zero-valent aluminum/iron-bearing clay composite activating, at a pH value in a range of 3.00 to 9.00, the persulfate to remove a refractory organic pollutant in the solution.

In a preferable embodiment, the organic pollutant may include be one selected from the group consisting of 4-chlorophenol, benzoic acid, nitrobenzene, phenol and an ofloxacin in form of solution.

In a preferable embodiment, in the refractory organic matter removing method using the zero-valent aluminum/iron-bearing clay composite, the zero-valent aluminum/iron-bearing clay composite activates, at the pH value of 3, the persulfate to remove the refractory organic pollutant.

In a preferable embodiment, the preparation method of the composite catalyst may specifically include: mixing the micro-scale zero-valent aluminum with the particle size about 75 μm with the nontronite in the mass ratio of 1:1 and then placing in the agate ball milling jar of 50 mL; adding the agate balls with the ball to material mass ratio of 20:1 to the agate ball milling jar; putting the agate ball milling jar into the vacuum jacket for vacuumizing and then performing the ball milling to obtain the mixed powder, where the duration of the ball milling is controlled to be 1.0 h, and the rotation rate of planetary ball mill is controlled to be 600 rpm; and placing the mixed powder obtained after the ball milling in the glove box, and drying the mixed powder to obtain a zero-valent aluminum/nontronite composite; where the zero-valent aluminum/nontronite composite of 100 mg as the composite catalyst, and the persulfate of 476 mg/L are added into wastewater of 200 mL containing 4-chlorophenol of 20.0 mg/L and reacted for 1 h.

Compared with related arts, the present disclosure may at least have following beneficial effects.

(1) In the present disclosure, the zero-valent aluminum/iron-bearing clay composite is prepared as a composite catalyst using a simple ball milling method, and the preparation method and operation process thereof are simple. Compared with a chemical synthesis method, the method of the present disclosure brings about less secondary pollution, and has a shorter synthesis time, higher yield and lower cost.

(2) The modified material used in the present disclosure is the natural iron-bearing clay, which is widely available, non-toxic and stable as a heterogeneous catalyst.

(3) The zero-valent aluminum/iron-bearing clay composite of the present disclosure has a good activation efficiency on the PS, and a range of the pH value thereof is wide and in a range of 3 to 9.

(4) The zero-valent aluminum/iron-bearing clay composite of the present disclosure can activate the PS to perform oxidative removal of different refractory organics, and has a wide application range.

(5) The present disclosure performs ball milling of the zero-valent aluminum and the iron-bearing clay, which not only destroys a oxide film of zero-valent aluminum to increase an activity thereof, but also uses the strong reducibility of the zero-valent aluminum to promote the Fe cycle in the iron-bearing clay and enhance the activation ability of persulfate by the composite.

(6) The mass ratio between the micro-scale zero-valent aluminum and the natural iron-bearing clay mineral is 1:1. By comparison of removal rates of the 4-chlorophenol by the zero-valent aluminum/nontronite composite with different mass ratios, the removal efficiency of the 4-chlorophenol by the composite catalyst rises first and then falls with increasing mass ratio, and an optimum effect is achieved at a feeding ratio of 1:1.

(7) The natural iron-bearing clay is nontronite, the composite of which with the zero-valent aluminum can activate the persulfate more effectively than montmorillonite, attapulgite and bentonite, which may be caused by the difference in iron content thereof and the occupation of structural iron in the clay.

(8) The zero-valent aluminum/nontronite composite can efficiently activate the PS to degrade the 4-chlorophenol in pH of a solution range of 3.00 to 9.00, and the catalytic reactivity thereof increases with decreasing pH of the solution, since the corrosion of the zero-valent aluminum is enhanced in acidic conditions, which results in its enhanced contribution to the Fe cycle in the nontronite.

DETAILED DESCRIPTION OF EMBODIMENTS

The present disclosure is further explained combined with following embodiments.

Embodiment 1

A method for preparing a zero-valent aluminum/iron-bearing clay composite is provided.

Figure 1:
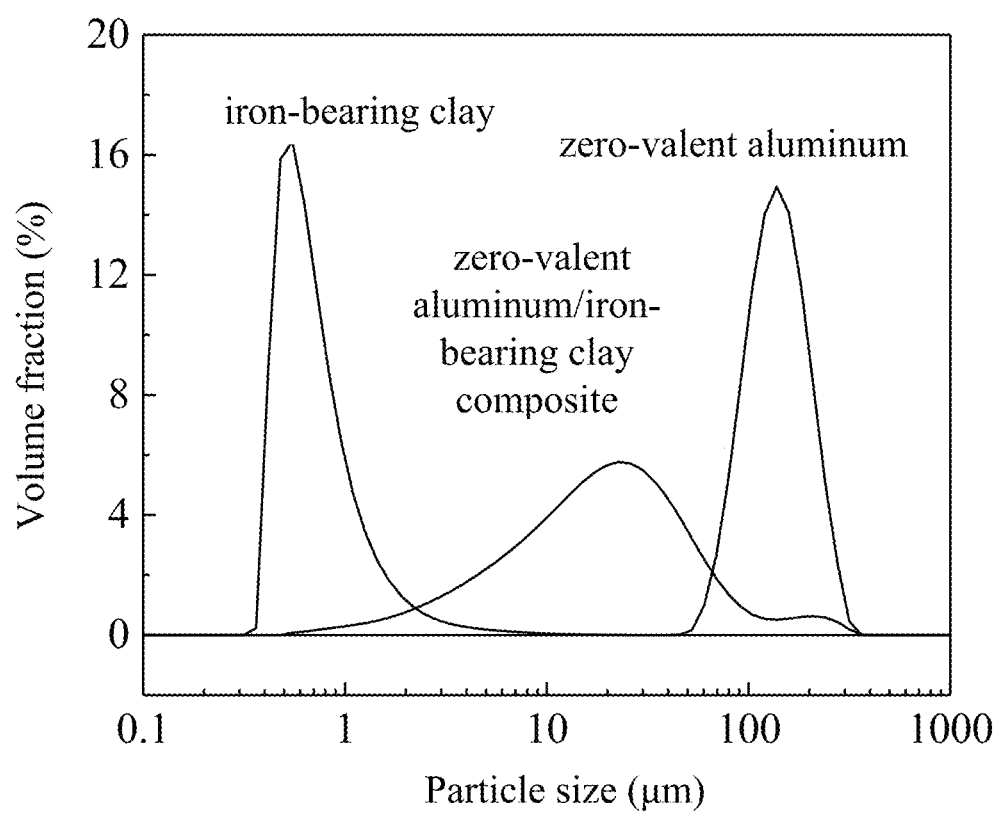
FIG. 1 illustrates particle size distributions of a zero-valent aluminum, an iron-bearing clay and a zero-valent aluminum/iron-bearing clay composite.
Figure 2:
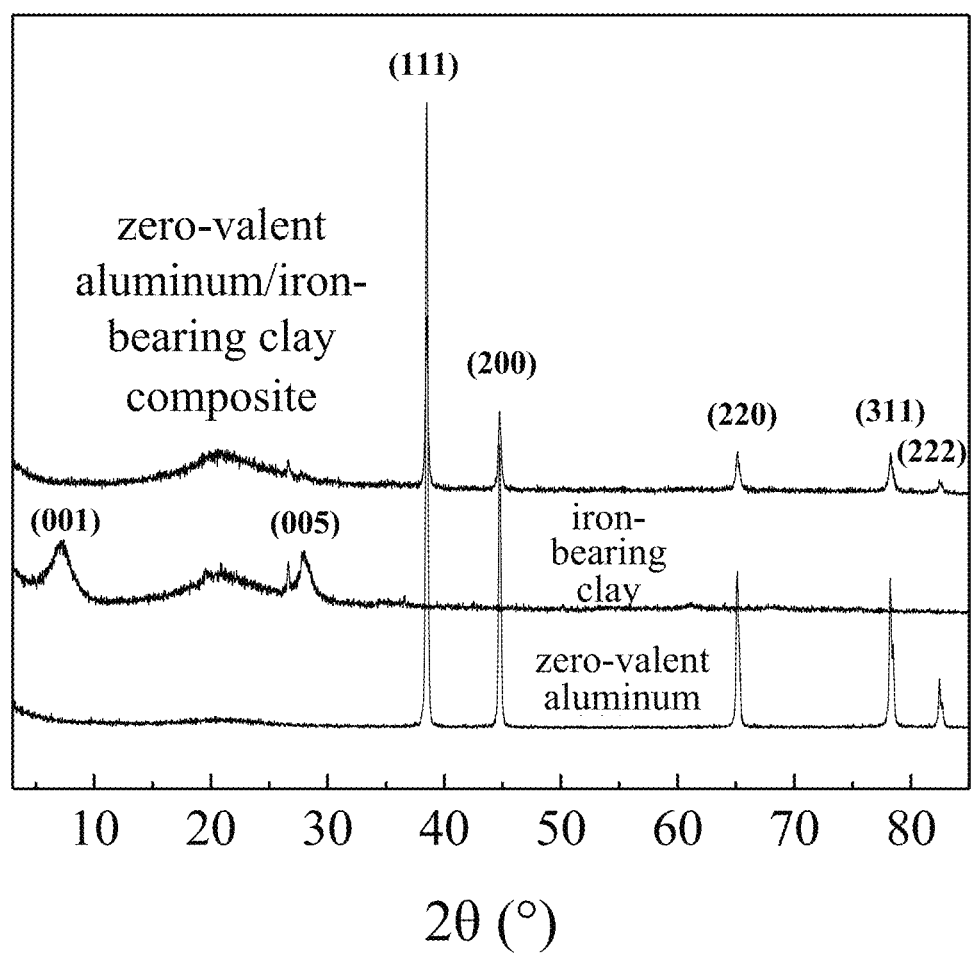
FIG. 2 illustrates X-ray diffraction (XRD) spectra of a zero-valent aluminum, an iron-bearing clay and a zero-valent aluminum/iron-bearing clay composite.
Figure 3A:
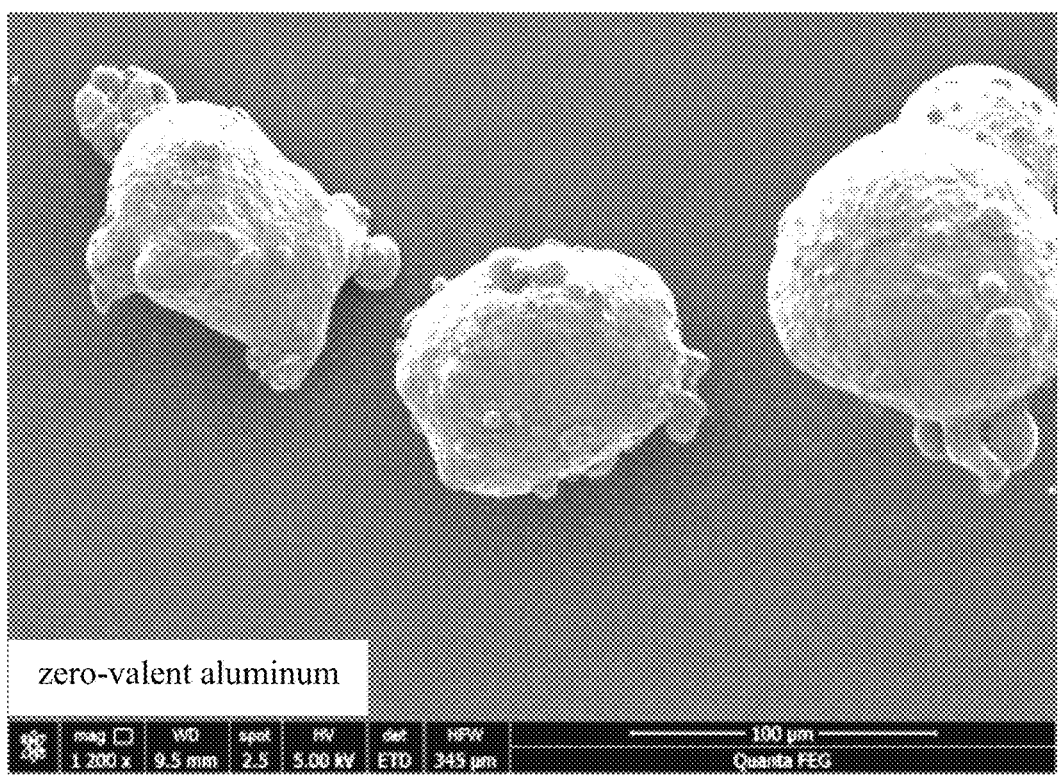
FIGS. 3A to 3F illustrates scanning electron micrographs of a zero-valent aluminum, an iron-bearing clay and a zero-valent aluminum and iron-bearing clay composite.
Figure 3B:
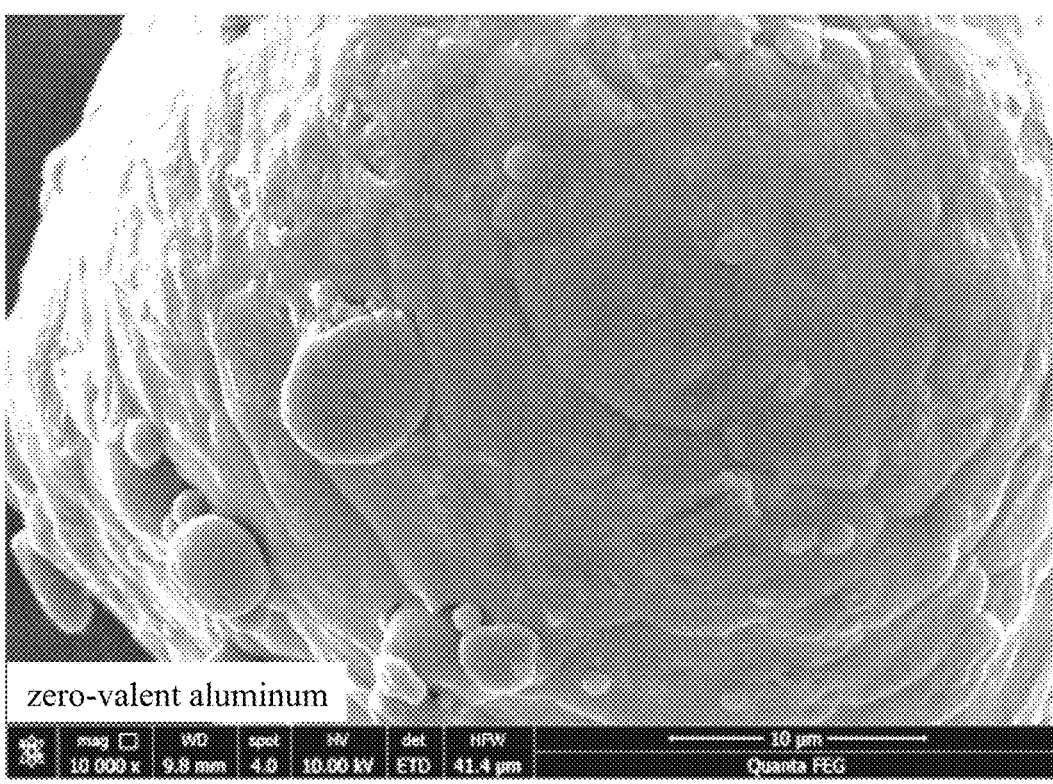
Figure 3C:
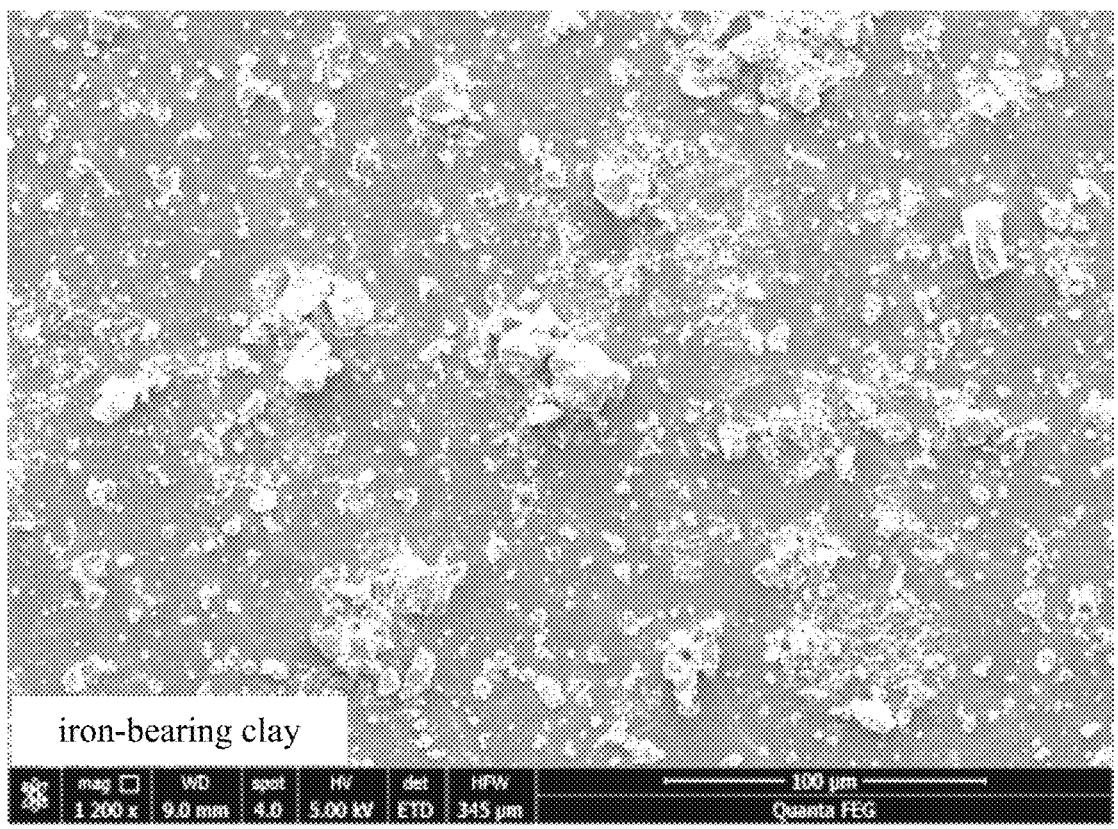
Figure 3D:
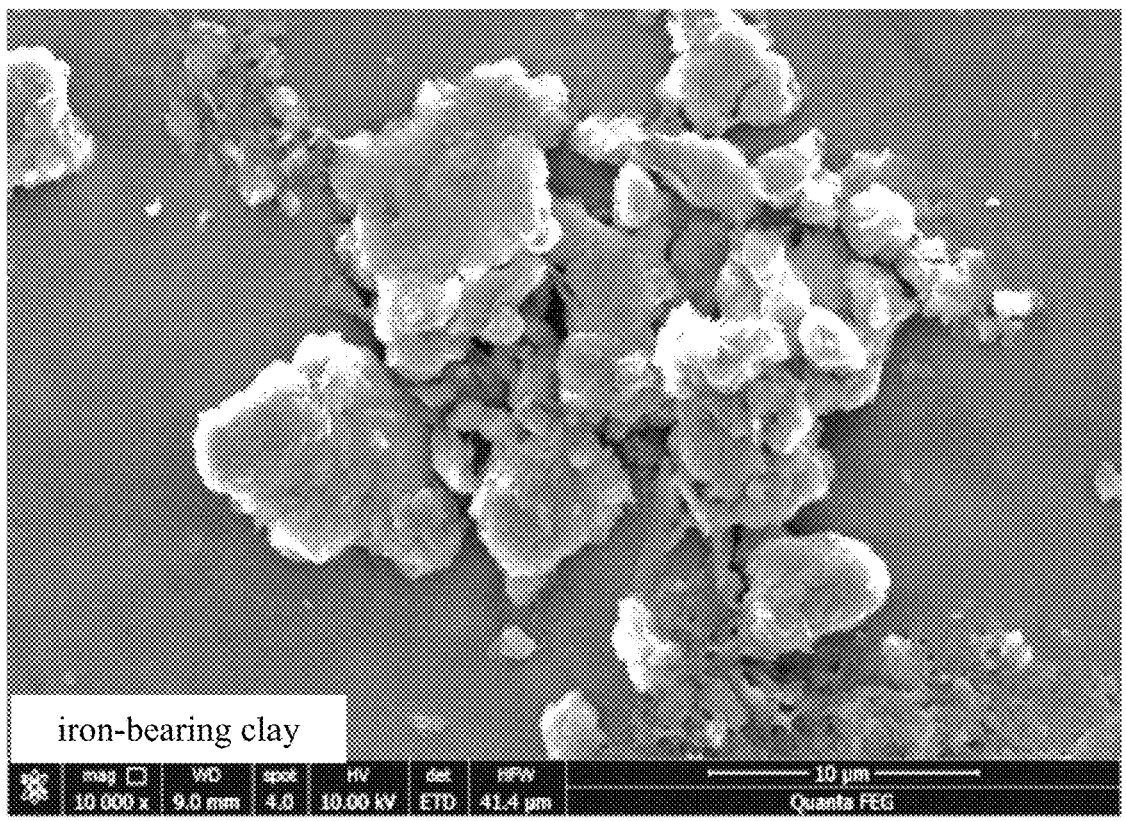
Figure 3E:
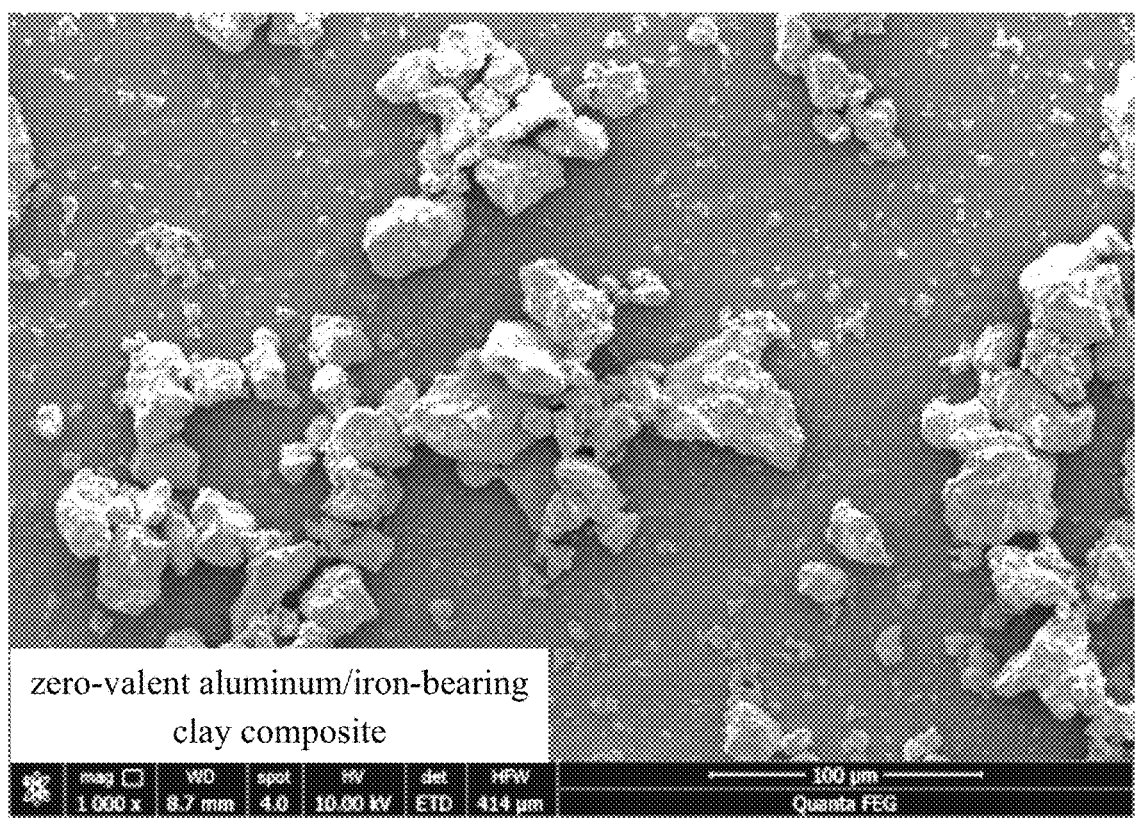
Figure 3F:

The method includes: mixing a micro-scale zero-valent aluminum of a particle size about 110 μm with nontronite (generally with a chemical formula: $Na_{0.3}Fe^{3+}_2(Si, Al)_4O_{10}(OH)_2 \cdot n(H_2O)$) in a mass ratio of 1:1 and then placing in an agate ball milling jar of 50 mL; adding agate balls with a ball to material mass ratio of 20:1 to the agate ball milling jar; putting the agate ball milling jar into a vacuum jacket for vacuumizing and then performing ball milling to obtain mixed powder; and placing the mixed powder obtained after the ball milling in a glove box, and drying the mixed powder to obtain the zero-valent aluminum/iron-bearing clay composite, where a duration of the ball milling is controlled to be 1.0 h, and a rotation rate of planetary ball mill is controlled to be 600 rpm. FIG. 1 illustrates particle size distributions of the zero-valent aluminum, the nontronite and the zero-valent aluminum/nontronite composite. Median particle sizes of the zero-valent aluminum and the nontronite are 111.75 μm and 0.60 respectively, while a median particle size of the zero-valent aluminum/nontronite composite is 15.44 which indicates that particles of the zero-valent aluminum are broken after the ball milling process, resulting in the particle size thereof is reduced. In FIG. 2, the relative intensities of characteristic peaks of the zero-valent aluminum decreases, which indicates that the grain size and crystal regularity thereof are reduced, which is also related to destruction of the oxide film. The electron micrographs in FIGS. 3A to 3F also show that a particle size of the produced composite is lower than that of the zero-valent aluminum, and a surface thereof is rougher, which may be caused by a mutual doping and compaction of fragments of the clay and the zero-valent aluminum. Through an characterization of X-ray photoelectron spectroscopy (XPS), it is found that an iron element in the iron-bearing clay is Fe(III). After ball milling with the zero-valent aluminum, 47.0% of the Fe is reduced to Fe(II), and Fe(II) has a strong activation effect on PS.

Figure 4:
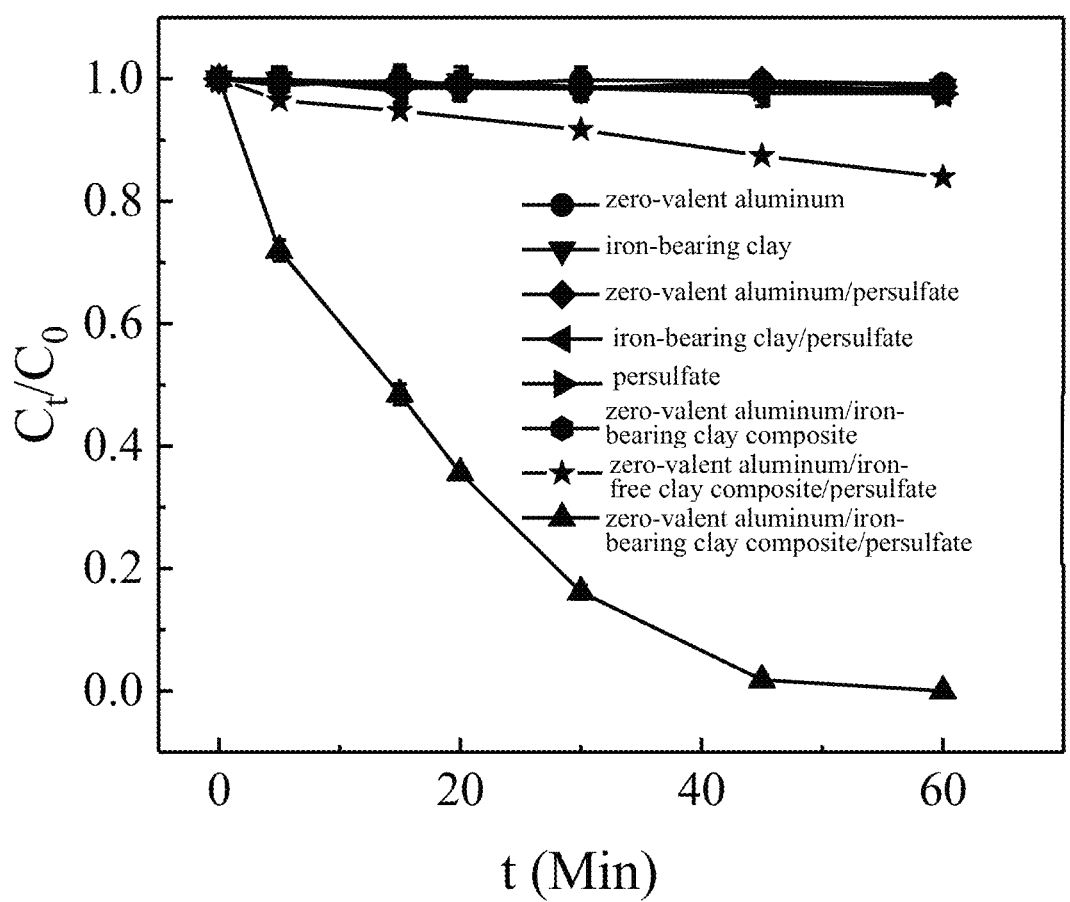
FIG. 4 illustrates degradation kinetic curves of a refractory organic of 4-chlorophenol in different systems.

An iron-free clay, synthetic lithium montmorillonite, is used to replace the nontronite, and the method as in the embodiment 1 is used to synthesize a composite zero-valent aluminum/iron-free clay composite for comparison. FIG. 4 illustrates a comparison of degradation efficiency of a laboratory simulated wastewater sample containing a refractory organic of 4-chlorophenol. An initial concentration of the 4-chlorophenol in the simulated wastewater is 20 mg/L. The zero-valent aluminum/iron-bearing clay composite of 100 mg, a zero-valent aluminum/iron-free clay composite of 100 mg, the zero-valent aluminum of 50 mg, an iron-bearing clay of 50 mg, the persulfate of 476 mg/L are respectively added in the corresponding solution of the 4-chlorophenol of 200 mL. Residual contents ($C_t/C_0$) of the 4-chlorophenol in the systems are measured by liquid chromatography. As can be seen in FIG. 4, the zero-valent aluminum, the nontronite and other composite catalysts have no degradation effect on the 4-chlorophenol, and the first two have no activation ability of persulfate to degrade the 4-chlorophenol; a removal rate of the 4-chlorophenol by the zero-valent aluminum/iron-free clay composite is only 16.2% with activation of the persulfate for 1 h, while the zero-valent aluminum/nontronite composite can efficiently activate persulfate to degrade the 4-chlorophenol pollutant, and achieve a removal rate of 100%.

Embodiment 2

Figure 5:
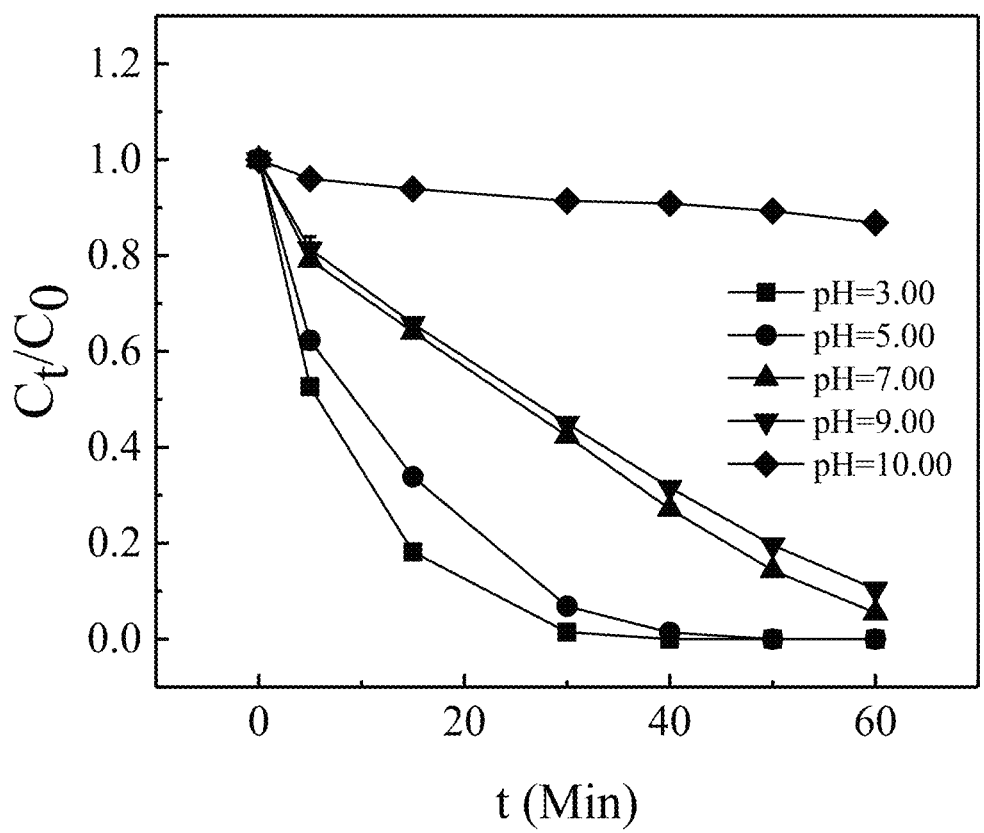
FIG. 5 illustrates degradation kinetic curves of a refractory organic of 4-chlorophenol by a zero-valent aluminum/iron-bearing clay composite with a pH value in a range of 3.00 to 10.00.

An application of the zero-valent aluminum/nontronite composite prepared in the embodiment 1 for efficiently activating a persulfate (PS) and removing a refractory organic is provided, which may include following steps.

step (1), preparing wastewater containing 4-chlorophenol of 20.0 mg/L as a laboratory simulated water sample; and step (2), measuring 5 portions of the solutions of 200 mL in the step (1) in 5 conical flasks, adjusting pH values of the solutions to 3.00, 5.00, 7.00, 9.00 and 10.00, respectively, adding the zero-valent aluminum/nontronite composite of 100 mg and the persulfate of 476 mg/L to each of the 5 conical flasks, taking samples at different reaction time using syringes, and detecting residual contents of 4-chlorophenol ($C_t/C_0$) in the systems by liquid chromatography, the relevant results of which are shown in FIG. 5. As can be seen from FIG. 5, the zero-valent aluminum/nontronite composite can efficiently activate PS to degrade the 4-chlorophenol in a solution pH range of 3.00 to 9.00, and the reactivity of the composite increases with decreasing pH of the solution.

Embodiment 3

A method for preparing a zero-valent aluminum/iron-bearing clay composite is provided.

The method includes: mixing a micro-scale zero-valent aluminum of a particle size about 75 µm with the nontronite in mass ratios of 1:2, 1:1, 2:1, 4:1, and 8:1 and then placing in agate ball milling jars of 50 mL; adding agate balls with a ball to material mass ratio of 20:1 to each of the agate ball milling jars; putting each of the agate ball milling jars into a vacuum jacket for vacuumizing and then performing ball milling to obtain mixed powder; and placing the mixed powder in a glove box, and drying the mixed powder to obtain the zero-valent aluminum/iron-bearing clay composite, where a duration of the ball milling is controlled to be 1.0 h, and a rotation rate of planetary ball mill is controlled to be 600 rpm.

200 mL of wastewater containing 4-chlorophenol is used as a laboratory simulated water sample. An initial concentration of the 4-chlorophenol in the water sample is 20.0 mg/L, and the composite of 100 mg and a persulfate of 476 mg/L are added to the water sample to react for 1 h. In this process, an actual degradation efficiency of the 4-chlorophenol is detected by liquid chromatography. Table 1 shows comparison of the removal rates of the 4-chlorophenol by the composite catalysts with different mass ratios of the zero-valent aluminum and the nontronite, the rate for the removal of 4-chlorophenol by the zero-valent aluminum/nontronite composite rises first and then falls with the increasing mass ratio, and an optimum condition is achieved at a feeding ratio of 1:1.

TABLE 1

Comparison of removal rates of the 4-chlorophenol by composite catalysts of zero-valent aluminum and nontronite with different mass ratios in embodiment 3

| Feeding mass ratio (zero-valent aluminum:nontronite) | 1:2 | 1:1 | 2:1 | 4:1 | 8:1 |
|---|---|---|---|---|---|
| Removal rate (%) | 49.8 | 100.0 | 92.4 | 83.8 | 41.9 |

Embodiment 4

A method for preparing a zero-valent aluminum/iron-bearing clay composite is provided.

The method includes: mixing a micro-scale zero-valent aluminum of a particle size about 150 µm with montmorillonite in a mass ratio of 1:1 and then placing in an agate ball milling jar of 50 mL; adding agate balls with a ball to material mass ratio of 20:1 to the agate ball milling jar; putting the agate ball milling jar into a vacuum jacket for vacuumizing and then performing ball milling to obtain mixed powder, where a duration of the ball milling is controlled to be 1.0 h, and a rotation rate of planetary ball mill is controlled to be 600 rpm; and placing the mixed powder obtained after the ball milling in a glove box, and drying the mixed powder to obtain the zero-valent aluminum/montmorillonite composite.

200 mL of wastewater containing benzoic acid is used as a laboratory simulated water sample. An initial concentration of the benzoic acid in the water sample is 12.2 mg/L, and the composite catalyst as per a ration in a range of 0.2 g/L to 1.5 g/L and a persulfate as per a ratio of 476 mg/L are added to the water sample to react for 1 h. In this process, an actual degradation efficiency of the benzoic acid is detected by liquid chromatography. The best degradation efficiency of the benzoic acid is achieved when the composite catalyst is dosed at 0.5 g/L, with a removal rate of 54.0%.

Embodiment 5

A method for preparing a zero-valent aluminum/iron-bearing clay composite is provided.

The method includes: mixing a micro-scale zero-valent aluminum of a particle size about 90 μm with attapulgite in a mass ratio of 1:1 and then placing in an agate ball milling jar of 50 mL; adding agate balls with a ball to material mass ratio of 20:1 to the agate ball milling jar; putting the agate ball milling jar into a vacuum jacket for vacuumizing and then performing ball milling to obtain mixed powder, where a duration of the ball milling is controlled to be 1.0 h, and a rotation rate of planetary ball mill is controlled to be 600 rpm; and placing the mixed powder obtained after the ball milling in a glove box, and drying the mixed powder to obtain the zero-valent aluminum/attapulgite composite.

200 mL of wastewater containing phenol is used as a laboratory simulated water sample. An initial concentration of the phenol in the water sample is 9.14 mg/L, and the composite catalyst as per a ratio of 0.5 g/L and the persulfate as per a ration in a range of 119 mg/L to 1904 mg/L are added to the water sample to react for 1 h. In this process, an actual degradation efficiency of the phenol is detected by liquid chromatography. The degradation efficiency of the phenol increases with the increasing amount of the persulfate added, with a maximum removal rate of 67.2%.

Embodiment 6

A method for preparing a zero-valent aluminum/iron-bearing clay composite is provided.

The method includes: mixing a micro-scale zero-valent aluminum of a particle size about 130 μm with bentonite in a mass ratio of 1:1 and then placing in an agate ball milling jar of 50 mL; adding agate balls with a ball to material mass ratio of 20:1 to the agate ball milling jar; putting the agate ball milling jar into a vacuum jacket for vacuumizing and then performing ball milling to obtain mixed powder, where a duration of the ball milling is controlled to be 1.0 h, and a rotation rate of planetary ball mill is controlled to be 600 rpm; and placing the mixed powder obtained after the ball milling in a glove box, and drying the mixed powder to obtain the zero-valent aluminum/bentonite composite.

200 mL of wastewater containing ofloxacin is used as a laboratory simulated water sample. An initial concentration of the ofloxacin in the water sample is 36.1 mg/L, and the composite catalyst as per a ratio of 0.5 g/L and a persulfate as per a ratio of 476 mg/L are added to the water sample react for 1 h. In this process, an actual degradation efficiency of the ofloxacin is detected by liquid chromatography.

Embodiment 7

A method for preparing a zero-valent aluminum/iron-bearing clay composite is provided.

The method includes: mixing a micro-scale zero-valent aluminum of a particle size about 130 μm individually with nontronite, montmorillonite and attapulgite in a mass ratio of 1:1 and then placing in an agate ball milling jar of 50 mL; adding agate balls with a ball to material mass ratio of 20:1 to each of the agate ball milling jars; putting each of the agate ball milling jars into a vacuum jacket for vacuumizing and then performing ball milling to obtain mixed powder, where a duration of the ball milling is controlled to be 1.0 h, and a rotation rate of planetary ball mill is controlled to be 600 rpm; and placing the mixed powder obtained after the ball milling in a glove box, and drying the mixed powder to obtain a zero-valent aluminum/nontronite composite, a zero-valent aluminum/montmorillonite composite, and a zero-valent aluminum/attapulgite composite.

200 mL of wastewater containing 4-chlorophenol is used as a laboratory simulated water sample. An initial concentration of the 4-chlorophenol in the laboratory simulated water sample is 20.0 mg/L, and each of the three composite catalysts of 100 mg and a persulfate of 476 mg/L are added to the water sample to react for 1 h. In this process, actual degradation efficiency of the 4-chlorophenol is detected by liquid chromatography. Table 2 is Comparison of removal rates of the 4-chlorophenol by different composite catalysts of zero-valent aluminum and iron-bearing clay in embodiment 7. The zero-valent aluminum/nontronite shows the best degradation efficiency of the 4-chlorophenol with a removal rate of 100%, while the zero-valent aluminum/attapulgite has the least degradation efficiency with a removal rate of 30.7%.

TABLE 2

Comparison of removal rates of the 4-chlorophenol by different composite catalysts of zero-valent aluminum and iron-bearing clay in embodiment 7

| Composite catalyst | zero-valent aluminum/ nontronite | zero-valent aluminum/ montmorillonite | zero-valent aluminum/ attapulgite |
|---|---|---|---|
| Removal rate (%) | 100.0 | 44.0 | 30.7 |

The present disclosure is not limited to the specific technical solutions described in the above embodiments, and all technical solutions formed by equivalent substitution are the protection scope required by the present disclosure.

What is claimed is:

1. A refractory organic matter removing method using a zero-valent aluminum/iron-bearing clay composite, comprising:
   adding the zero-valent aluminum/iron-bearing clay composite as per a ratio in a range of 0.2 g/L to 1.5 g/L and a persulfate as per a ratio in a range of 119 mg/L to 1904 mg/L into an organic pollutant solution, and the zero-valent aluminum/iron-bearing clay composite activating, at a pH value in a range of 3.00 to 9.00, the persulfate to remove a refractory organic pollutant in the solution, wherein the organic pollutant is one selected from the group consisting of 4-chlorophenol, benzoic acid, nitrobenzene, phenol and an ofloxacin in form of solution;
   wherein the zero-valent aluminum/iron-bearing clay composite is prepared as a composite catalyst by mixing a micro-scale zero-valent aluminum and a natural iron-bearing clay mineral with ball milling, a particle size of the micro-scale zero-valent aluminum is in a range of 100 meshes to 200 meshes, namely 75 μm to 150 μm, and the natural iron-bearing clay mineral is nontronite;
   wherein a preparation method of the composite catalyst comprises:
      mixing the micro-scale zero-valent aluminum with the natural iron-bearing clay mineral in a mass ratio of 1:1 and then placing in an agate ball milling jar;
      adding agate balls with a ball to material mass ratio in a range of 20:1 to 50:1 to the agate ball milling jar;
      putting the agate ball milling jar into a vacuum jacket for vacuumizing and then performing ball milling to obtain mixed powder, wherein a duration of the ball milling is controlled in a range of 0.5 hours (h) to 4 h, and a rotation rate of planetary ball mill is controlled in a range of 200 revolutions per minute (rpm) to 800 rpm; and placing the mixed powder obtained after the ball milling in a glove box, and drying the mixed powder to obtain the zero-valent aluminum/iron-bearing clay composite.

2. The refractory organic matter removing method using the zero-valent aluminum/iron-bearing clay composite according to claim 1, wherein the zero-valent aluminum/iron-bearing clay composite activates, at the pH value of 3, the persulfate to remove the refractory organic pollutant.

3. The refractory organic matter removing method using the zero-valent aluminum/iron-bearing clay composite according to claim 1, wherein the preparation method of the composite catalyst specifically comprises:

mixing the micro-scale zero-valent aluminum with the particle size 75 μm with the nontronite in the mass ratio of 1:1 and then placing in the agate ball milling jar of 50 mL;

adding the agate balls with the ball to material mass ratio of 20:1 to the agate ball milling jar;

putting the agate ball milling jar into the vacuum jacket for vacuumizing and then performing the ball milling to obtain the mixed powder, wherein the duration of the ball milling is controlled to be 1.0 h, and the rotation rate of planetary ball mill is controlled to be 600 rpm; and placing the mixed powder obtained after the ball milling in the glove box, and drying the mixed powder to obtain a zero-valent aluminum/nontronite composite;

wherein the zero-valent aluminum/nontronite composite of 100 mg as the composite catalyst and the persulfate of 476 mg/L are added into a wastewater of 200 mL containing 4-chlorophenol of 20.0 mg/L and reacted for 1 h.

\* \* \* \* \*